US009226365B2

(12) United States Patent (10) Patent No.: US 9,226,365 B2
Tanigawa et al. (45) Date of Patent: Dec. 29, 2015

(54) LIGHTING SYSTEM

(71) Applicant: Panasonic Corporation, Osaka (JP)

(72) Inventors: Tetsuya Tanigawa, Hyogo (JP); Atsuo Nanahara, Kyoto (JP); Shinji Matsuda, Saitama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 162 days.

(21) Appl. No.: 13/908,056

(22) Filed: Jun. 3, 2013

(65) Prior Publication Data

US 2013/0342113 A1 Dec. 26, 2013

(30) Foreign Application Priority Data

Jun. 25, 2012 (JP) ................................. 2012-142367

(51) Int. Cl.
*G05B 19/00* (2006.01)
*G08B 5/22* (2006.01)
(Continued)

(52) U.S. Cl.
CPC .............. *H05B 37/02* (2013.01); *H05B 37/029* (2013.01); *H05B 37/0227* (2013.01); *H05B 37/0245* (2013.01); *Y02B 20/44* (2013.01)

(58) Field of Classification Search
CPC .............. H05B 37/029; H05B 33/0803; H05B 33/0842; H05B 37/0236; F21K 9/135; F21K 9/50; F21V 23/0464; F21V 3/04; F21W 2121/006; F21Y 2101/02; G02B 6/0008; G02B 6/001; G02B 6/0031; G02B 6/0036; G02B 6/0043; G02B 6/0055; G02B 6/006; G02B 6/0061; G02B 6/0095
USPC ........ 340/5.1, 7.1, 7.61, 845.4; 315/151, 157, 315/308
See application file for complete search history.

(56) References Cited

U.S. PATENT DOCUMENTS 8,134,461 B2 * 3/2012 Van Doorn ......... H05B 33/0803
315/291
8,280,558 B2 * 10/2012 Picco ............................ 700/295
(Continued)

FOREIGN PATENT DOCUMENTS

CN 101541123 A 9/2009
CN 102098836 A 6/2011
(Continued)

OTHER PUBLICATIONS

Chinese Office Action for corresponding Chinese Application No. 201310256172.0 dated Dec. 3, 2014 (English Translation).
(Continued)

*Primary Examiner* — Fekadeselassie Girma
*Assistant Examiner* — Emily C Terrell
(74) *Attorney, Agent, or Firm* — Renner, Otto, Boisselle & Sklar, LLP

(57) ABSTRACT

The lighting system includes a plurality of controllers each configured to control one or more lighting apparatuses. Each controller is configured to associate a set of coordinates of a position in an image taken by an image sensor thereof with an address of the lighting apparatus selected as a control object of a particular controller out of the other controllers. Each controller is configured to, when a person is detected by the image processing unit thereof, determine the set of coordinates of a position of the detected person; and, when the lighting apparatus associated with the determined set of coordinates is the control object of the particular controller, send a control signal to the particular controller. The particular controller is configured to, upon receiving the control signal, light the lighting apparatus corresponding to the determined set of coordinates.

8 Claims, 2 Drawing Sheets

(51) Int. Cl.
- *H04Q 1/30* (2006.01)
- *G08B 5/00* (2006.01)
- *G05B 23/00* (2006.01)
- *G06F 7/00* (2006.01)
- *G06F 7/04* (2006.01)
- *G08B 29/00* (2006.01)
- *G08C 19/00* (2006.01)
- *H04B 1/00* (2006.01)
- *H04B 3/00* (2006.01)
- *H04Q 1/00* (2006.01)
- *H05B 37/02* (2006.01)

(56) References Cited

U.S. PATENT DOCUMENTS

| | | | |
|---|---|---|---|
| 8,754,960 B2* | 6/2014 | Ashdown | G03B 15/02 348/143 |
| 2008/0265799 A1* | 10/2008 | Sibert | 315/292 |
| 2011/0210672 A1 | 9/2011 | Yoshii et al. | |
| 2011/0260654 A1 | 10/2011 | Tanigawa et al. | |
| 2012/0019168 A1* | 1/2012 | Noda et al. | 315/307 |
| 2012/0086345 A1* | 4/2012 | Tran | 315/158 |
| 2012/0206050 A1* | 8/2012 | Spero | 315/152 |

FOREIGN PATENT DOCUMENTS

| | | |
|---|---|---|
| CN | 102170742 | 8/2011 |
| JP | 2002-134282 A | 5/2002 |
| JP | 2005-005041 A | 1/2005 |
| JP | 2008-091160 A | 4/2008 |
| JP | 2009-238399 A | 10/2009 |
| JP | 2009-238548 A | 10/2009 |
| JP | 2011-228174 A | 11/2011 |

OTHER PUBLICATIONS

Chinese Office Action for corresponding Chinese Application No. 201310256172.0 dated Jun. 30, 2015 (English Translation).

* cited by examiner

LIGHTING SYSTEM

TECHNICAL FIELD

The present invention relates to lighting systems.

BACKGROUND ART

To date, lighting systems have been supplied in which a plurality of lighting apparatuses and a controller for controlling the lighting apparatuses are connected via a communication line (see, for example, Japanese Laid-Open Patent Publication No. 2009-238399, hereinafter, referred to as Patent Literature 1). In such a lighting system, the controller includes an image sensor, and controls the lighting apparatuses individually according to a detected position of a person in an image taken by the image sensor. Thus, even in a case where a detection area of the image sensor is wide, only the lighting apparatus located at the detected position of the person can be lit.

However, in a case where a plurality of the lighting systems as disclosed in Patent Literature 1 are provided, the controllers do not communicate with each other, and the plurality of the lighting systems each operate as an independent system. Therefore, when an imaging area of the image sensor in one of the lighting systems includes a lighting area of the lighting apparatus in another one of the lighting systems, the lighting apparatus of the other one of the lighting systems cannot be lit.

SUMMARY OF INVENTION

The present invention is made to solve the aforementioned problem, and an object of the present invention is to propose a lighting system enabling one controller to also control a lighting apparatus selected as a control object of another controller.

The lighting system according to the present invention includes a plurality of controllers each configured to control one or more lighting apparatuses. Each of the lighting apparatuses has an address specific thereto. Each of the lighting apparatuses includes: a first communication unit configured to communicate with the controller selecting the corresponding lighting fixture as a control object; a light source; and a first control unit configured to light the light source. Each of the controllers includes: an image sensor configured to take an image of a lighting area of the lighting apparatus selected as the control object of the corresponding controller; an image processing unit configured to detect presence of a person in an image taken by the image sensor, the image processing unit being configured to, upon detecting a person, determine a set of coordinates of a position of the detected person; a second control unit configured to operate the lighting apparatus selected as the control object of the corresponding controller according to a detection result from the image processing unit; and a second communication unit configured to communicate with the lighting apparatus selected as the control object of the corresponding controller. Each of the controllers is configured to associate the set of coordinates of a position in the image taken by the image sensor of the controller with the address of the lighting apparatus selected as the control object of a particular controller out of the other controllers. Each of the controllers is configured to, when a person is detected by the image processing unit of the controller, determine the set of coordinates of a position of the detected person, and, when the lighting apparatus associated with the determined set of coordinates is the control object of the particular controller, send a control signal to the particular controller. The particular controller is configured to, upon receiving the control signal, light the lighting apparatus associated with the determined set of coordinates. The lighting apparatus selected as the control object means the lighting apparatus to be directly controlled by the controller.

The lighting system of the present invention includes a plurality of controllers each configured to control one or more lighting apparatuses. Each of the lighting apparatuses has an address specific thereto, and includes: a first communication unit configured to communicate with the controller selecting the corresponding lighting fixture as a control object; a light source; and a first control unit configured to light the light source. Each of the controllers includes: an image sensor configured to take an image of a lighting area of the lighting apparatus selected as the control object of the corresponding controller; an image processing unit configured to detect presence of a person in an image taken by the image sensor, the image processing unit being configured to, upon detecting a person, determine a set of coordinates of a position of the detected person; a second control unit configured to operate the lighting apparatus selected as the control object of the corresponding controller according to a detection result from the image processing unit; and a second communication unit configured to communicate with the lighting apparatus selected as the control object of the corresponding controller. Each of the controllers is configured to associate the set of coordinates of a position in the image taken by the image sensor of a particular controller out of the other controllers with the address of the lighting apparatus selected as the control object thereof. Each of the controllers is configured to, when the particular controller sends a control signal in response to detection of a person by the image processing unit thereof, light the lighting apparatus associated with the position of the person detected by the particular controller.

In the lighting system, the control signal preferably includes the address of the lighting apparatus selected as the control object of the particular controller.

In the lighting system, the control signal preferably includes information representing the set of coordinates of a position of the person detected by the image processing unit of the particular controller.

Further, it is also preferable that, in the lighting system, each of the controllers is configured to control the image sensor in such a manner to take the image each time the lighting apparatus being lit is switched in a process of lighting all the lighting apparatuses one by one sequentially. Each of the controllers is configured to associate the set of coordinates of a position in the lighting area of the lighting apparatus being lit with the address of the lighting apparatus being lit, with regard to each of the images taken by the image sensor through the process.

DESCRIPTION OF EMBODIMENTS

Hereinafter, a lighting system according to one embodiment of the present invention will be described with reference to FIG. 1 and FIG. 2.

Figure 1:
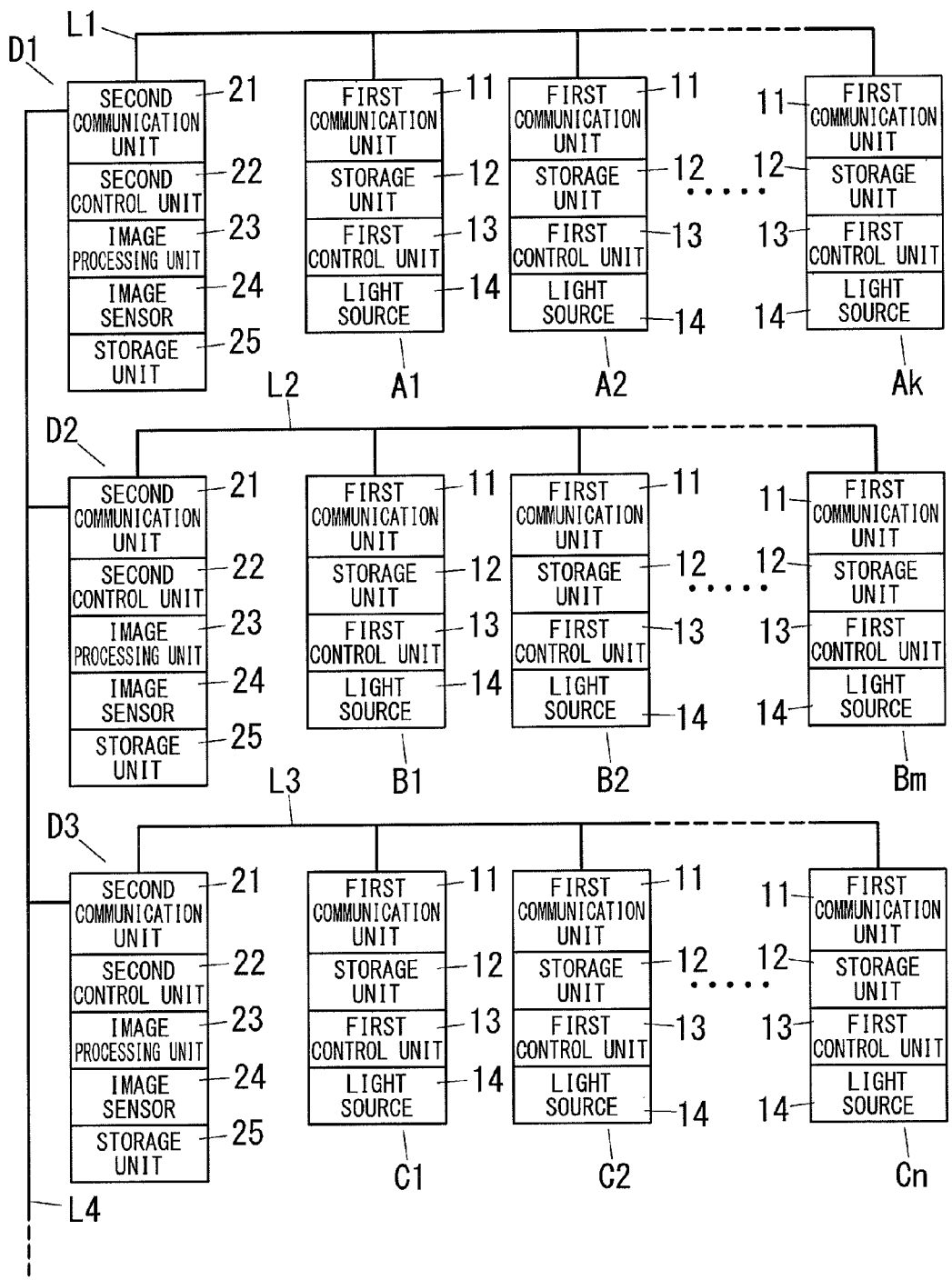
FIG. 1 is a schematic diagram illustrating an exemplary configuration of a lighting system according to one embodiment of the present invention.
Figure 2:
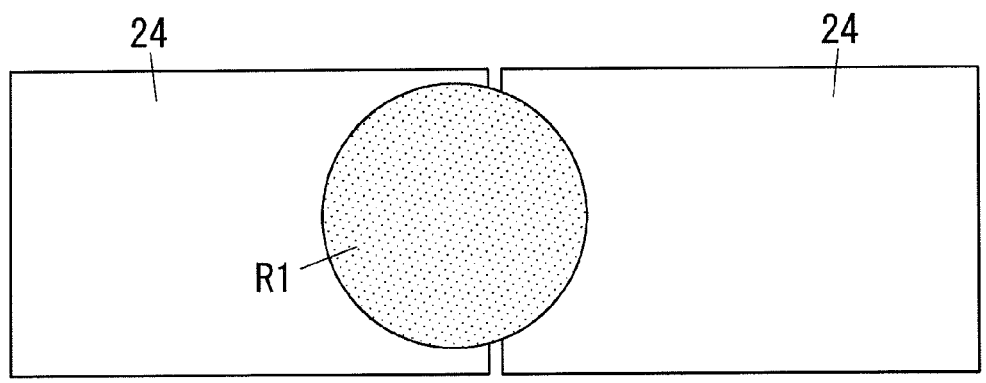
FIG. 2 shows explanatory diagrams (a) and (b) illustrating an operation of associating a set of coordinates of a position in an image taken by an image sensor of the above lighting system with an address of a lighting apparatus.
Figure 2:
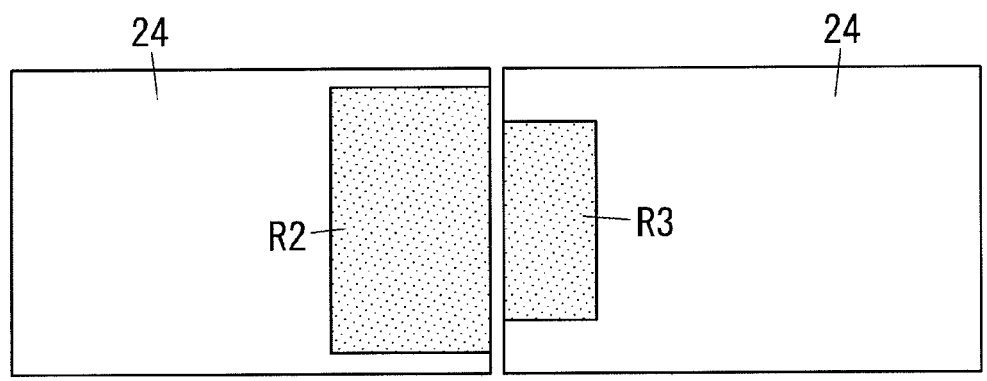

FIG. 1 is a schematic diagram illustrating an exemplary configuration of the lighting system according to the present embodiment. The lighting system includes a plurality (three in the present embodiment) of controllers D1 to D3, and a plurality of lighting apparatuses A1 to Ak (k=1, 2, ...), B1 to Bm (m=1, 2, ...), and C1 to Cn (n=1, 2, ...). The lighting apparatuses A1 to Ak are connected to the controller D1 via a communication line L1, and turn on or off respective light sources 14 according to operation instructions from the controller D1. The lighting apparatuses B1 to Bm are connected to the controller D2 via a communication line L2, and turn on or off respective light sources 14 according to operation instructions from the controller D2. The lighting apparatuses C1 to Cn are connected to the controller D3 via a communication line L3, and turn on or off respective light sources 14 according to operation instructions from the controller D3. Namely, in the present embodiment, the controller D1 selects the lighting apparatuses A1 to Ak as control objects thereof, and the controller D2 selects the lighting apparatuses B1 to Bm as the control objects thereof, and the controller D3 selects the lighting apparatuses C1 to Cn as the control objects thereof. Further, the controllers D1 to D3 are connected to each other via a communication line L4, and the controllers D1 to D3 can communicate with each other by using second communication units 21 described below.

Each of the lighting apparatuses A1 to Ak includes a first communication unit 11 configured to communicate with the controller D1, a storage unit 12, the light source 14, and a first control unit 13 configured to light the light source 14. The light source 14 is, for example, a straight tube fluorescent lamp. The first control unit 13 is an electric ballast employing a high-frequency lighting circuit designed to light the aforementioned fluorescent lamp, for example. The first communication unit 11 performs wired-communication with the second communication unit 21 (described below) of the controller D1 via the communication line L1, and thus receives the operation instruction or the like transmitted from the controller D1, and transmits, to the controller D1, an address of the corresponding lighting apparatus, or the like. The storage unit 12 is a non-volatile memory (e.g., an EEPROM) for example, and stores the address of the corresponding lighting apparatus, and the like.

Each of the lighting apparatuses B1 to Bm includes the first communication unit 11 configured to communicate with the controller D2, the storage unit 12, the light source 14, and the first control unit 13 configured to light the light source 14. The first communication unit 11 performs wired-communication with the second communication unit 21 (described below) of the controller D2 via the communication line L2, and thus receives the operation instruction or the like transmitted from the controller D2, and transmits, to the controller D2, the address of the corresponding lighting apparatus, or the like. The storage unit 12 is a non-volatile memory (e.g., an EEPROM) for example, and stores the address of the corresponding lighting apparatus, and the like. The light source 14 and the first control unit 13 are the same as those used in the lighting apparatuses A1 to Ak, and explanations thereof are deemed unnecessary.

Each of the lighting apparatuses C1 to Cn includes the first communication unit 11 configured to communicate with the controller D3, the storage unit 12, the light source 14, and the first control unit 13 configured to light the light source 14. The first communication unit 11 performs wired-communication with the second communication unit 21 (described below) of the controller D3 via the communication line L3, and thus receives the operation instruction or the like transmitted from the controller D3, and transmits, to the controller D3, the address of the corresponding lighting apparatus, or the like. The storage unit 12 is a non-volatile memory (e.g., an EEPROM) for example, and stores the address of the corresponding lighting apparatus, or the like. The light source 14 and the first control unit 13 are the same as those used in the lighting apparatuses A1 to Ak, and explanations thereof are deemed unnecessary.

The controller D1 includes: the second communication unit 21 configured to communicate with the lighting apparatuses A1 to Ak and the controllers D2 and D3; a second control unit 22; an image processing unit 23; an image sensor 24; and a storage unit 25. The image sensor 24 is integrally constituted by a solid-state image pickup device (e.g., a CCD or CMOS image sensor), an optical lens, and a signal processing circuit. The image sensor 24 is installed on a ceiling, a wall surface, or the like of a room defined as a lighting space to take an image of the room and output image data representing the taken image. In the present embodiment, the image sensor 24 is located to take an image of an area that is defined so as to include lighting areas of the respective lighting apparatuses A1 to Ak, and outputs the resultant image data to the image processing unit 23. The image processing unit 23 is configured to detect presence of a person based on the image data inputted from the image sensor 24. The image processing unit 23 is configured to, upon detecting a person, determine a set of coordinate of a position of the detected person. The storage unit 25 is a non-volatile memory (e.g., an EEPROM) for example. The storage unit 25 stores the addresses of the respective lighting apparatuses A1 to Ak respectively selected as the control objects of the controller D1. Further, the storage unit 25 stores a correspondence relation between the set of coordinates of the position in the imaging area of the image sensor 24 of the corresponding controller D1 and the address of the lighting apparatus out of the lighting apparatuses B1 to Bm and C1 to Cn selected as the control objects of the other controllers D2 and D3.

The second communication unit 21 performs wired-communication with the first communication units 11 of the respective lighting apparatuses A1 to Ak via the communication line L1, and thus receives the addresses or the like transmitted from the lighting apparatuses A1 to Ak, and transmits the operation instructions or the like to the lighting apparatuses A1 to Ak. Further, the second communication unit 21 performs wired-communication with the second communication unit 21 of each of the controllers D2 and D3 via the communication line L4, and thus transmits a control signal for turning on or off the lighting apparatus selected from the lighting apparatuses B1 to Bm and C1 to Cn designated as the control objects of the controllers D2 and D3. For example, the second control unit 22 is realized by using a microcomputer. The second control unit 22 creates the operation instruction to be transmitted to the lighting apparatus selected from the lighting apparatuses A1 to Ak according to the set of coordinates of a position of a person detected by the image processing unit 23. Note that, the operation instruction includes the address of the lighting apparatus selected from the lighting apparatuses A1 to Ak and a lighting signal.

The controller D2 includes: the second communication unit 21 configured to communicate with the lighting apparatuses B1 to Bm and the controllers D1 and D3; the second control unit 22; the image processing unit 23; the image sensor 24; and the storage unit 25. The image sensor 24 has the same configuration as that of the controller D1. The image sensor 24 takes an image of an area that is defined so as to include the lighting areas of the respective lighting apparatuses B1 to Bm, and outputs image data representing the taken image to the image processing unit 23. The image processing unit 23 is configured to detect presence of a person based on the image data inputted from the image sensor 24. The image processing unit 23 is configured to, upon detecting a person, determine the set of coordinates of a position of the detected person. The storage unit 25 is a non-volatile memory (e.g., an EEPROM) for example. The storage unit 25 stores the addresses of the respective lighting apparatuses B1 to Bm selected as the control objects of the controller D2. Further, the storage unit 25 stores the correspondence relation between the set of coordinates of the position in the imaging area of the image sensor 24 of the corresponding controller D2 and the address of the lighting apparatus out of the lighting apparatuses A1 to Ak and C1 to Cn selected as the control objects of the other controllers D1 and D3.

The second communication unit 21 performs wired-communication with the first communication units 11 of the respective lighting apparatuses B1 to Bm via the communication line L2, and thus receives the addresses or the like transmitted from the lighting apparatuses B1 to Bm, and transmits the operation instructions or the like to the lighting apparatuses B1 to Bm. Further, the second communication unit 21 performs wired-communication with the second communication unit 21 of each of the controllers D1 and D3 via the communication line L4, and thus transmits a control signal for turning on or off the lighting apparatus selected from the lighting apparatuses A1 to Ak and C1 to Cn designated as the control objects of the controllers D1 and D3. For example, the second control unit 22 is realized by using a microcomputer. The second control unit 22 creates the operation instruction to be transmitted to the lighting apparatus selected from the lighting apparatuses B1 to Bm according to the set of coordinates of a position of a person detected by the image processing unit 23. Additionally, the operation instruction includes the address of the lighting apparatus selected from the lighting apparatuses B1 to Bm and the lighting signal.

The controller D3 includes: the second communication unit 21 configured to communicate with the lighting apparatuses C1 to Cn and the controllers D1 and D2; the second control unit 22; the image processing unit 23; the image sensor 24; and the storage unit 25. The image sensor 24 has the same configuration as that of the controller D1. The image sensor 24 takes an image of an area that is defined so as to include the lighting areas of the respective lighting apparatuses C1 to Cn, and outputs image data representing the taken image to the image processing unit 23. The image processing unit 23 is configured to detect presence of a person based on the image data inputted from the image sensor 24. The image processing unit 23 is configured to, upon detecting a person, determine the set of coordinates of a position of the detected person. The storage unit 25 is a non-volatile memory (e.g., an EEPROM) for example. The storage unit 25 stores the addresses of the respective lighting apparatuses C1 to Cn selected as the control objects of the controller D3. Further, the storage unit 25 stores the correspondence relation between the set of coordinates of the position in the imaging area of the image sensor 24 of the corresponding controller D3 and the address of the lighting apparatus out of the lighting apparatuses A1 to Ak and B1 to Bm selected as the control objects of the other controllers D1 and D2.

The second communication unit 21 performs wired-communication with the first communication units 11 of the respective lighting apparatuses C1 to Cn via the communication line L3, and thus receives the addresses or the like transmitted from the lighting apparatuses C1 to Cn, and transmits the operation instructions or the like to the lighting apparatuses C1 to Cn. Further, the second communication unit 21 performs wired-communication with the second communication unit 21 of each of the controllers D1 and D2 via the communication line L4, and thus transmits a control signal for turning on or off the lighting apparatus selected from the lighting apparatuses A1 to Ak and B1 to Bm designated as the control objects of the controllers D1 and D2. For example, the second control unit 22 is realized by using a microcomputer. The second control unit 22 creates the operation instructions to be transmitted to the lighting apparatus selected from the lighting apparatuses C1 to Cn according to the set of coordinates of a position of a person detected by the image processing unit 23. Besides, the operation instruction includes the address of the lighting apparatus selected from the lighting apparatuses C1 to Cn and the lighting signal.

In the lighting system according to the present embodiment, as described above, with regard to each one of the controllers (e.g., D1 to D3), the set of coordinates of the position in the imaging area of the image sensor 24 thereof is associated with the address of the lighting apparatus designated as the control object of a particular controller out of the other controllers (D1 to D3) which is selected from the lighting apparatuses (e.g., A1 to Ak, B1 to Bm, and C1 to Cn) designated as the control objects of the controllers (e.g., D1 to D3) based on a predetermined rule, and such an association is stored in the storage unit 25 thereof. The following explanation referring to FIG. 2 is made to a procedure for making the above association.

FIG. 2(a) shows a state where the lighting apparatus A1 is lit in response to the operation instruction from the controller D1. The lighting area R1 of the lighting apparatus A1 overlaps both the imaging area (the left side in FIG. 2(a)) of the image sensor 24 of the controller D1, and the imaging area (the right side in FIG. 2(a)) of the image sensor 24 of the controller D2. The image processing unit 23 of the controller D1 determines a coordinate area R2 (see FIG. 2(b)) included in the lighting area of the lighting apparatus A1, based on the image data obtained by the image sensor 24 of the controller D1, and stores the coordinate area R2 in association with the address of the lighting apparatus A1 in the storage unit 25. Further, the image processing unit 23 of the controller D2 determines a coordinate area R3 (see FIG. 2(b)) included in the lighting area of the lighting apparatus A1, based on the image data obtained by the image sensor 24 of the controller D2, and stores the coordinate area R3 in association with the address of the lighting apparatus A1 in the storage unit 25. Transmitting the address of the lighting apparatus A1 being lit from the controller D1 to the controllers D2 and D3 enables the controller D2 to associate the set of coordinates of a position in the imaging area of the image sensor 24 of the controller D2 with the address of the lighting apparatus A1. When the association process for the lighting apparatus A1 is completed, the controller D1 lights the lighting apparatuses A2, A3, . . . , Ak one by one in this order, and performs the association process in a similar manner.

When the association for the lighting apparatuses A1 to Ak selected as the control objects of the controller D1 is completed, the controller D1 transmits, to the controller D2, an operation instruction for performing the association process. Upon receiving the operation instruction, the controller D2 lights the lighting apparatuses B1 to Bm one by one sequentially so as to perform the association process in a similar manner. Further, when the association process for the lighting apparatuses B1 to Bm selected as the control objects of the controller D2 is completed, the controller D2 transmits, to the controller D3, an operation instruction for performing the association process. Upon receiving the operation instruction, the controller D3 lights the lighting apparatuses C1 to Cn one by one sequentially so as to perform the association process in a similar manner. Namely, in the present embodiment, each of the controllers D1 to D3 is configured to control the image sensor thereof in such a manner to take the image each time the lighting apparatus being lit is switched in a process of lighting all the lighting apparatuses one by one sequentially. Each of the controllers D1 to D3 associates the set of coordinates of a position in the lighting area of the lighting apparatus being lit with the address of the lighting apparatus being lit, with regard to each of the images taken by the image sensor through the above process.

The following explanation is made to an operation performed when a person is detected in the coordinate area R3 in the imaging area of the image sensor 24 of the controller D2. When a person is detected in the coordinate area R3 by the image processing unit 23 of the controller D2, the second control unit 22 retrieves, from the storage unit 25, the address of the lighting apparatus A1 associated with the coordinate area R3, and creates the control signal including the retrieved address and the lighting signal. The second control unit 22 transmits the control signal via the second communication unit 21 to the controllers D1 and D3. Since the address included in the control signal is not identical to any of the addresses of the respective lighting apparatuses selected as the control objects of the controller D3, the controller D3 discards the control signal. Since the address included in the control signal is identical to one of the addresses of the respective lighting apparatuses selected as the control objects of the controller D1, the controller D1 accepts the control signal, and creates the operation instruction including the address of the lighting apparatus A1 and the lighting signal, according to the control signal. The controller D1 transmits the operation instruction via the second communication unit 22 to the lighting apparatuses A1 to Ak. The lighting apparatuses A2 to Ak discard the operation instruction since the address included in the operation instruction is different from their own addresses. The lighting apparatus A1 accepts the operation instruction since the address included in the operation instruction is the same as its own address, and lights its own light source 14 according to the lighting signal included in the operation instruction.

Thus, according to the present embodiment, in a case where the lighting apparatus associated with the set of coordinates of a position determined by the image processing unit of one of the controllers is the lighting apparatus selected as the control object of the particular controller out of the other controllers, the control signal is transmitted to the particular controller. Hence, the lighting apparatus associated with the determined set of coordinates of the position can be lit. Therefore, it is possible to propose the lighting system enabling one controller to also control the lighting apparatus selected as the control object of another controller. Further, in the process of lighting all the lighting apparatuses one by one sequentially, the image sensor of each of the controllers takes an image each time the lighting apparatus being lit is switched. Consequently, with regard to each of the imaging areas of all the image sensors, the association between the set of coordinates of a position included in the imaging area and the address of the appropriate lighting apparatus selected from all the lighting apparatuses can be made automatically. Further, in the present embodiment, since the control signal outputted from one controller includes the address of the lighting apparatus selected as the control object of another controller, it is possible to light the lighting apparatus selected as the control object of another controller.

Additionally, in the present embodiment, in each one of the controllers, the set of coordinates of a position in the imaging area of the image sensor thereof is stored in the storage unit thereof in association with the address of the lighting apparatus selected as the control object of the particular controller out of the other controllers. However, in each one of the controllers, the address of the lighting apparatus selected as the control object thereof may be stored in the storage unit thereof in association with the set of coordinates of a position in the imaging area of the image sensor of the particular controller out of the other controllers. Also in this case, it is possible to turn on and off the lighting apparatus selected as the control object of the particular controller. In this case, in a process of making an association between the set of coordinates of a position included in the lighting area of the lighting apparatus being lit and the address of the lighting apparatus being lit with regard to the image taken by each of the image sensors, the controller which determines the set of coordinates of the position included in the lighting area of the lighting apparatus being lit sends the determined set of coordinates of the position to the controller selecting the lighting apparatus being lit as the control object. Accordingly, the controller receiving the determined set of coordinates of the position can associate between the received set of coordinates of the position and the address of the lighting apparatus being lit. Further, in the present embodiment, wired-communication is performed between each of the controllers and the lighting apparatuses to be controlled by the same controller, and wired-communication is performed among the controllers. However, wireless communication may be performed instead of the wired-communication.

The invention claimed is:

1. A lighting system comprising a plurality of controllers each configured to control one or more lighting apparatuses, wherein each of the lighting apparatuses has an address specific thereto, each of the lighting apparatuses includes:
 a first wired or wireless communication unit configured to communicate with the controller selecting the corresponding lighting fixture as a control object;
 a light source; and
 a first controller configured to light the light source, each of the controllers includes:
 an image sensor configured to take an image of a lighting area of the lighting apparatus selected as the control object of the corresponding controller;
 an image processor configured to receive the image data taken by the image sensor, the image processor being configured to detect presence of a person in the image taken by the image sensor, and the image processor being configured to, upon detecting a person, determine a set of coordinates of a position of the detected person;
 a second controller configured to operate the lighting apparatus selected as the control object of the corresponding controller according to a detection result from the image processor; and
 a second wired or wireless communication unit configured to communicate with the lighting apparatus selected as the control object of the corresponding controller, each of the controllers is configured to
 associate the set of coordinates of a position in the image taken by the image sensor of the controller with the address of the lighting apparatus selected as the control object of a particular controller out of the other controllers, and each of the controllers is configured to
  when a person is detected by the image processor of the controller, determine the set of coordinates of a position of the detected person, and
  when the lighting apparatus associated with the determined set of coordinates is the control object of the particular controller, send a control signal to the particular controller, and
the particular controller is configured to, upon receiving the control signal, light the lighting apparatus associated with the determined set of coordinates.

2. A lighting system comprising a plurality of controllers each configured to control one or more lighting apparatuses, wherein
  each of the lighting apparatuses has an address specific thereto,
  each of the lighting apparatuses includes:
    a first wired or wireless communication unit configured to communicate with the controller selecting the corresponding lighting fixture as a control object;
    a light source; and
    a first controller configured to light the light source,
  each of the controllers includes:
    an image sensor configured to take an image of a lighting area of the lighting apparatus selected as the control object of the corresponding controller;
    an image processor configured to receive the image data taken by the image sensor, the image processor being configured to detect presence of a person in an image taken by the image sensor, and the image processor being configured to, upon detecting a person, determine a set of coordinates of a position of the detected person;
    a second controller to operate the lighting apparatus selected as the control object of the corresponding controller according to a detection result from the image processor; and
    a second wired or wireless communication unit configured to communicate with the lighting apparatus selected as the control object of the corresponding controller,
  each of the controllers is configured to associate the set of coordinates of a position in the image taken by the image sensor of a particular controller out of the other controllers with the address of the lighting apparatus selected as the control object thereof, and,
  each of the controllers is configured, when the particular controller sends a control signal in response to detection of a person by the image processor thereof, light the lighting apparatus associated with the position of the person detected by the particular controller.

3. The lighting system according to claim 1, wherein
the control signal includes the address of the lighting apparatus selected as the control object of the particular controller.

4. The lighting system according to claim 2, wherein
the control signal includes information representing the set of coordinates of a position of the person detected by the image processor of the particular controller.

5. The lighting system according to claim 1, wherein
each of the controllers is configured to control the image sensor in such a manner to take the image each time the lighting apparatus being lit is switched in a process of lighting all the lighting apparatuses one by one sequentially, and
each of the controllers is configured to associate the set of coordinates of a position in the lighting area of the lighting apparatus being lit with the address of the lighting apparatus being lit, with regard to each of the images taken by the image sensor through the process.

6. The lighting system according to claim 2, wherein
each of the controllers is configured to control the image sensor in such a manner to take the image each time the lighting apparatus being lit is switched in a process of lighting all the lighting apparatuses one by one sequentially, and
each of the controllers is configured to associate the set of coordinates of a position in the lighting area of the lighting apparatus being lit with the address of the lighting apparatus being lit, with regard to each of the images taken by the image sensor through the process.

7. The lighting system according to claim 3, wherein
each of the controllers is configured to control the image sensor in such a manner to take the image each time the lighting apparatus being lit is switched in a process of lighting all the lighting apparatuses one by one sequentially, and
each of the controllers is configured to associate the set of coordinates of a position in the lighting area of the lighting apparatus being lit with the address of the lighting apparatus being lit, with regard to each of the images taken by the image sensor through the process.

8. The lighting system according to claim 4, wherein
each of the controllers is configured to control the image sensor in such a manner to take the image each time the lighting apparatus being lit is switched in a process of lighting all the lighting apparatuses one by one sequentially, and
each of the controllers is configured to associate the set of coordinates of a position in the lighting area of the lighting apparatus being lit with the address of the lighting apparatus being lit, with regard to each of the images taken by the image sensor through the process.

* * * * *